United States Patent [19]

Scapa et al.

[11] Patent Number: 5,278,673
[45] Date of Patent: Jan. 11, 1994

[54] HAND-HELD SMALL DOCUMENT IMAGE RECORDER STORAGE AND DISPLAY APPARATUS

[76] Inventors: James R. Scapa, 4042 Hanover Ct., West Bloomfield, Mich. 48232; James E. Brancheau, 1303 N. Lafayette, Dearborn, Mich. 48128

[21] Appl. No.: 942,730

[22] Filed: Sep. 9, 1992

[51] Int. Cl.⁵ .......................................... H04N 1/024
[52] U.S. Cl. ................................... 358/473; 358/472; 358/158
[58] Field of Search .............................. 358/472, 473

[56] References Cited

U.S. PATENT DOCUMENTS

| | | | |
|---|---|---|---|
| 3,513,443 | 5/1970 | Andersen | 359/158 |
| 4,774,618 | 9/1988 | Raviv | 360/133 |
| 4,784,357 | 11/1988 | Dreyfus et al. | 358/285 |
| 4,819,083 | 4/1989 | Kawai et al. | 358/294 |
| 4,859,187 | 8/1989 | Peterson | 434/118 |
| 4,975,948 | 12/1990 | Andresen et al. | 379/355 |
| 4,980,910 | 12/1990 | Oba et al. | 379/355 |
| 5,019,697 | 5/1991 | Postman | 235/441 |

Primary Examiner—Edward L. Coles, Sr.
Assistant Examiner—Kimberly Williams
Attorney, Agent, or Firm—Basile and Hanlon

[57] ABSTRACT

A hand-held housing contains an image sensor, a processor, a memory, a visual display and input control buttons for recording, storing, displaying and retrieving images from a document, such as a business card. The image sensor generates electrical data signals representative of the image on a document as the housing is moved across the document in a scanning embodiment or the images on a document disposed beneath the housing in a single record embodiment, which signals are stored in the memory by the processor and concurrently displayed on the display. The input control buttons, through the control program executed by the processor, provide for scanning, storage and retrieval of images from memory for display. The processor stores the images in a linked list or lists in the memory and is capable of rearranging, adding or deleting any image associated with a particular document in any list in the memory.

35 Claims, 6 Drawing Sheets

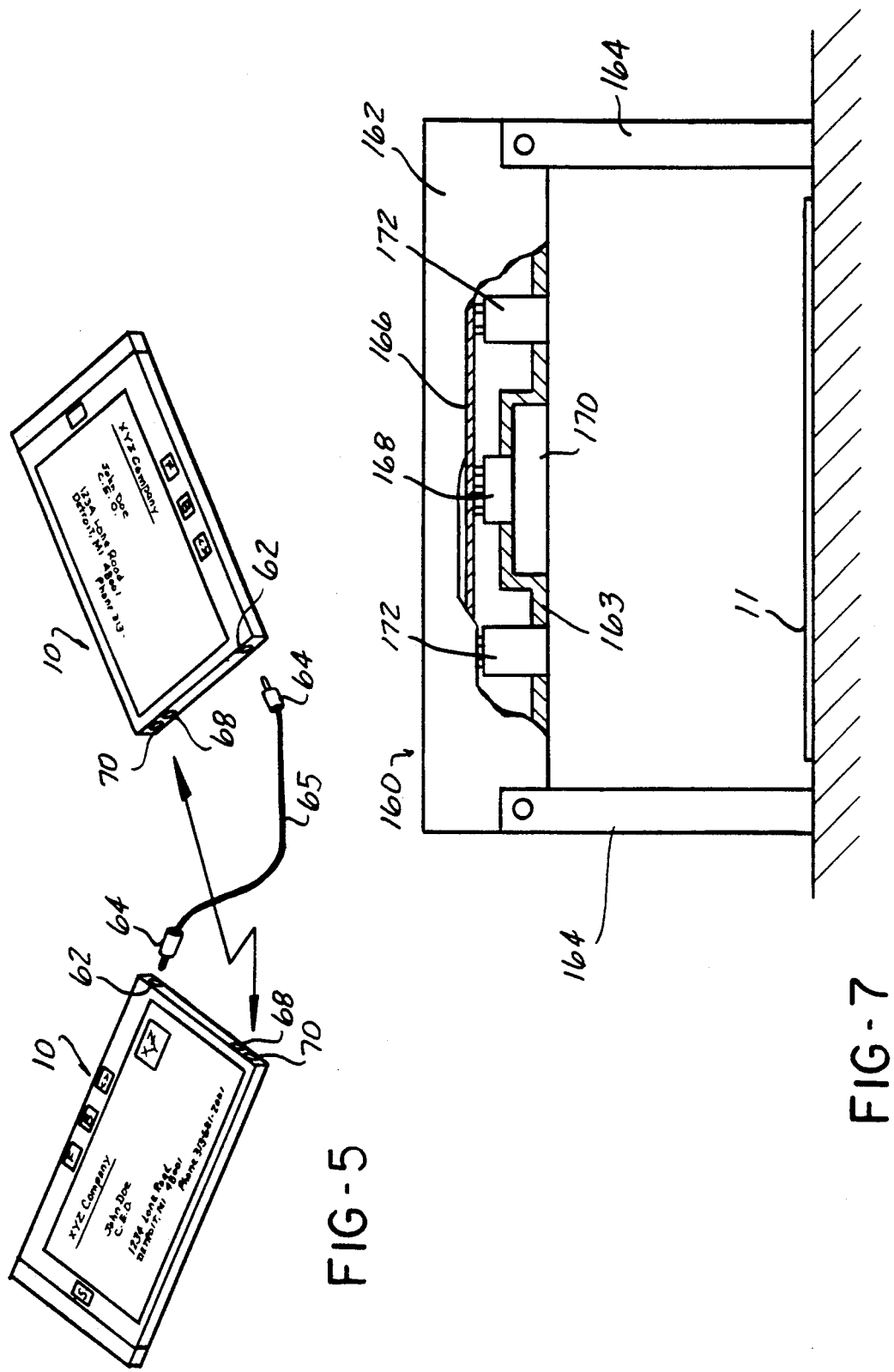

HAND-HELD SMALL DOCUMENT IMAGE RECORDER STORAGE AND DISPLAY APPARATUS

BACKGROUND OF THE INVENTION

1. Field of the Invention

The present invention relates, in general, to apparatus for scanning and storing images contained on documents.

2. Description of the Art

Many business people exchange and collect business cards with associates, customers or clients as a way of obtaining information including the address and telephone number of such individuals and their respective business or company name. Such business cards frequently include a brief description of the individual's company title, business or profession, services or products, as well as the company logo.

While some individuals are organized and carefully store business cards received from others in a folder or file, most individuals just toss the cards into a drawer or box. This makes it difficult and time consuming to find a particular individual's business card or to locate all of the cards of individuals associated with a particular company, or who offer a particular product or service.

Software is available for use on personal computers or PCs which enables customer or client names and addresses to be stored in memory, typically in alphabetical order, as well as providing the capability of retrieving and/or searching for a particular individual or company name, at least by alphabetical order. However, such software requires the manual transcription of information from business cards, letters, etc., into the computer memory via a keyboard. Further, the company logo and any information relating to an individual's company title, services or products, typically found on many business cards, cannot be transferred during such transcription. In addition, foreign language information found on some business cards is also lost during such transcription.

Another type of device which fulfills certain of he needs of a business person relating to retaining information on associates, customers or clients, etc., is an electronic organizer. These devices are similar to hand-held calculators and include a central processing unit, a memory, a small display and a full keyboard, even though the individual keys are relatively small. However, name and telephone information contained on business cards still must be manually transcribed into such devices via the small keyboard.

Thus, it would be desirable to provide an apparatus which is capable of easily transferring, storing, retrieving and displaying all of the information typically found on a business card.

Optical image scanners are currently available for scanning documents and making an immediate copy thereof. Such scanners are hand-held units which typically scan a document in narrow strips of several inches in width and generate copies thereof which can be pieced together to reproduce the entire document. Full page scanners are also available. However, such devices merely copy the document and do not provide any type of data processing for image storage, retrieval, display or arrangement in lists or categories.

Image scanning systems utilizing PCs and a full-size keyboard are capable of providing such storage, retrieval and display of information on a document, such as a business card. However, such systems are large and not easily portable.

Thus, it would be desirable to provide a hand-held, portable apparatus which is capable of scanning, storing and displaying images found on small documents, such as business cards. It would also be desirable to provide an apparatus which is capable of scanning, storing and displaying all of the images on business cards including company logos, etc. It would also be desirable to provide an apparatus which is capable of arranging scanned and stored images from small documents in a list and, further, which is capable of retrieving such images in a predetermined list and adding, removing, or rearranging the images in a particular list into a particular order. It would also be desirable to provide such an apparatus which enables a user to categorize and link the images of documents stored in memory or input thereto in a number of different retrievable lists.

SUMMARY OF THE INVENTION

The present invention is a hand-held apparatus which is capable of scanning or recording images from small documents, such as business cards, and storing and displaying such images.

In one embodiment, the apparatus includes a hand-held housing in which a scanning means is mounted. The scanning means scans a document and provides an electrical signal data stream representative of the images on the document. The data stream is received by a processor means, mounted in the housing, which stores the data representative of the images on a single document in a memory which is also mounted in the housing. A display means is mounted on the housing and connected to the processor means for displaying the image of a single document currently being scanned or the image of a document stored in the memory. Input means are mounted on the housing and connected to the processor means for providing input signals to the processor means to initiate the scanning of a document and for controlling the sequence of retrieval of images from the memory for display of such images on the display means.

In a preferred embodiment, the memory includes a nonvolatile, read-only memory which stores control commands executed by the processor means and a nonvolatile read/write memory which stores the data signals representative of images on scanned documents. The scanning means preferably comprises a plurality of photodetectors mounted in the housing for detecting images reflected by light from the scanned document. A lens means may be mounted on the housing for focusing ambient light onto the document being scanned so as to reflect the image on the document to the photodetector means.

In an alternate embodiment, an auxiliary connector means is mounted on the housing and connected to the processor means. The auxiliary connector means provides an external connection path for a plug-in electrical conductor to connect the processor means in the housing with an external processor for the exchange of data representative of images on documents, such as business cards, therebetween. In addition, a remote wireless communication means may also be mounted in the housing and connected to the processor means. The remote communication means includes a transmitter and receiver for transmitting and receiving electrical data signals between the processor means and an external processor or data communication device.

The input means preferably comprises a plurality of buttons or keys mounted on the housing and connected to the processor means. One of the buttons is a "scan" button which supplies a signal, when actuated, to the processor means to initiate the start of recording and storing of images from a document. A "forward" button which supplies a forward recall signal to the processor means to initiate a first directional sequential retrieval and display of images stored in the memory in a predetermined order or list. Another input button is a "back" button which supplies a back or reverse recall signal to the processor means to initiate a second directional sequential display, opposite from the first directional sequence, and retrieval of images stored in the memory in a predetermined order. Finally, another input button is a "edit" button which, when activated, supplies an edit signal to the processor means to temporarily store the image currently displayed on the display means in a memory storage area while removing the image from a linked list in memory and for adding a temporarily removed image to another position in the list or a different list. The "edit" button can also be used to completely delete an image from memory.

The processor means includes means for linking a succession of images representing discrete documents input thereto into a sequential, linked list in the memory. Such means is also capable of providing separate, individually selectable lists of images corresponding to discrete documents which are linked together in a predetermined order.

In another embodiment, an image sensor means replaces the scanning means and/or lens and includes a plurality of photodetector elements arranged in a grid of rows and columns. An optical lens is mounted in the housing adjacent to the image sensor and focuses the image of a small document disposed underneath the housing onto the image sensor. Light means may also be mounted in the housing for creating a light source to illuminate the image on the small document. The image on the small document is recorded by the photodetectors which generate electrical signal data representative of the image on a pixel basis arranged in rows and columns. The output of the image sensor means is input to the central processing unit and processed as described in the first embodiment of the present invention.

In a third embodiment which represents a simplified form of the apparatus of the present invention, the apparatus lacks a scanning means or an image sensor means and is capable only of receiving input data representing the images on a small document via the auxiliary connector means or the remote communication means. In this embodiment, the central processing unit operates as described in the first two embodiments of the present invention to sequentially display, retrieve and reorder the document images input thereto under user control.

The apparatus of the present invention uniquely provides a means for recording, storing, retrieving and displaying all of the images found on small documents, particularly, business cards. The apparatus is hand-held and easily portable and is capable of storing all of the images, including corporate logos or designs, commonly found on business cards. This eliminates the need for manual transcription of business card information into a computer for subsequent retrieval. The apparatus permits easy retrieval of such information via the display thereby enabling an individual to obtain information concerning any of his or her associates, customers or clients. The apparatus also enables such business card images to be arranged in any predetermined order, including being categorized by company, subject matter, etc.

BRIEF DESCRIPTION OF THE DRAWING

The various features, advantages and other uses of the present invention will become more apparent by referring to the following detailed description and drawing in which:

FIG. 5 is a perspective view of the apparatus of the present invention showing remote communication features;

FIG. 7 is a partially broken away, side elevational view of another embodiment of the apparatus of the present invention.

DESCRIPTION OF THE PREFERRED EMBODIMENTS

Figure 1:
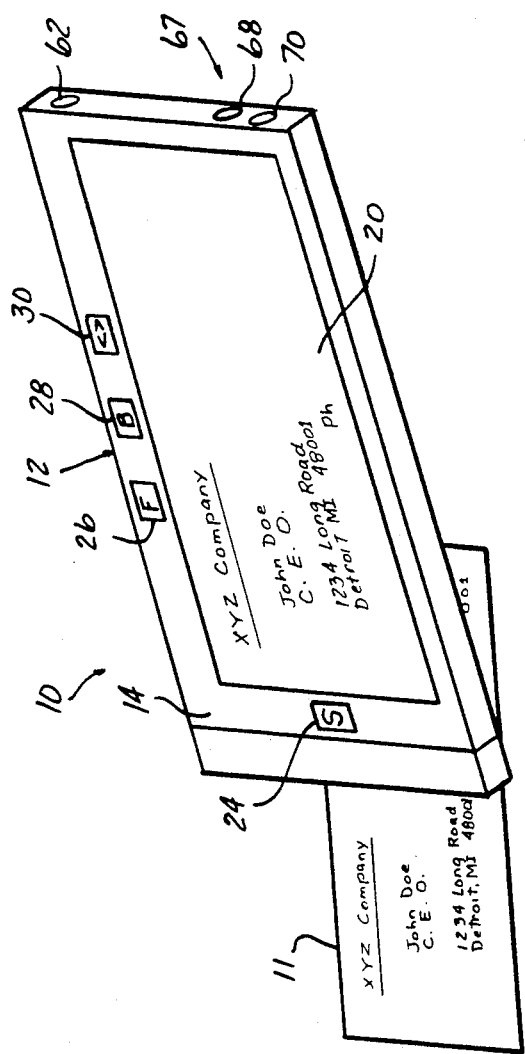
FIG. 1 is a perspective view showing the apparatus of the present invention scanning a business card.
Figure 2:
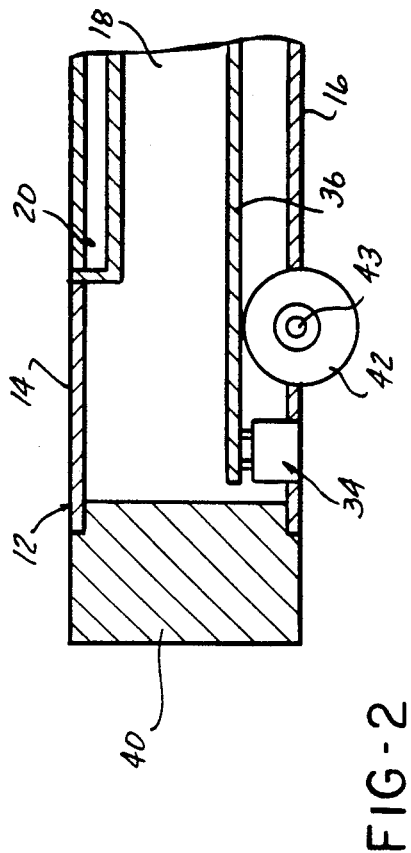
FIG. 2 is a partial, cross sectional view showing a portion of the interior structure of the apparatus shown in FIG. 1.
Figure 3:
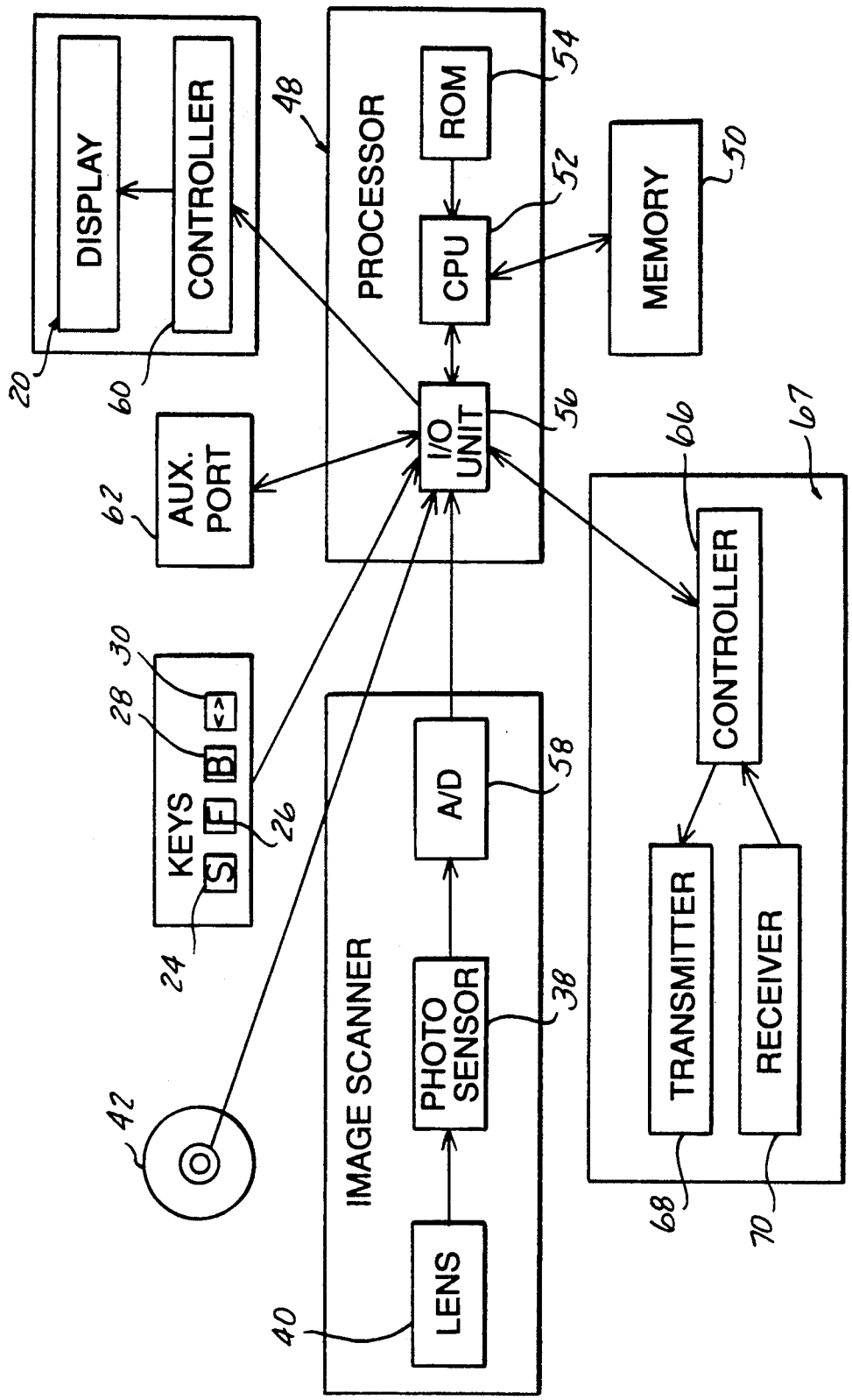
FIG. 3 is a block diagram showing the operational elements of the apparatus of the present invention.

Referring now to the drawing, and to FIGS. 1-3 in particular, there is depicted an image recording, storage and display apparatus 10. Although the apparatus 10 is specifically designed for recording and storing images on a small document 11, such as the illustrated standard 2 inch $\times$ 3½ inch business card, it will be understood that the apparatus 10 is equally usable for scanning any small document, such as the letterhead on a letter, handwritten notes, package address labels, return addresses on envelopes, etc.

The apparatus 10 includes a housing 12 which, by way of example only, has a shape generally corresponding to the shape of a standard business card and a size slightly larger than a standard business card. The housing 12 has a top surface 14, an opposed back surface 16, and interconnecting side edges forming a small handheld, preferably pocket size apparatus. The housing 12 may be formed of any suitable lightweight material, such as plastic, lightweight metals, etc. As shown in FIG. 2, an interior cavity 18 is formed within the housing 12 and contains the components of the apparatus 10 which are described in greater detail hereafter.

A suitable power source, not shown, is mounted within the cavity 18 in the housing 12. The power source may comprise conventional storage batteries, such as thin, disc-shaped batteries commonly employed in calculators, watches, etc. The batteries provide electrical power to the operative circuit elements of the apparatus 10. Further, such batteries can be inserted into the interior cavity 18 in the housing 12 through a cover mounted on the back surface 16, not shown.

A display means 20 is mounted in the housing 12 and has an exterior display panel visible through the top surface 14 of the housing 12. The display means 20 may comprise any suitable visual display, such as a thin panel LCD display. The number of lines and bits and overall size of the display 20 may be chosen to meet a desired resolution. For example, a display 20 having 100 dots per inch may be employed. Higher resolutions may be preferable and may also be obtained with the choice of a suitable display. Further, the display means 20 may be monochromatic or provide gray scale or color images.

Input means in the form of a plurality of individual buttons or keys are mounted in the housing 12 and are accessible through the top surface 14 thereof. In a preferred embodiment, the input means comprises four buttons, namely, a scan button labelled "S" and shown by reference number 24, a forward recall button labelled "F" and shown by reference number 26, a back recall button designated by the symbol "<>" and denoted by reference number 30. The functions of the various input buttons 24, 26, 28 and 30 will be described hereafter in connection with an operational description of the apparatus 10.

In a first embodiment shown in FIGS. 1-3, an image scanning means denoted generally by reference number 34 is mounted in the interior cavity 18 of the housing 12, preferably on a printed circuit board 36 mounted on the inner side of the back surface 16 of the housing 12. The scanning means 34 functions to optically scan the images on a document, such as a business card 11, as the apparatus 10 is moved slowly along the document or business card 11 and generates an electrical signal data stream representative of the scanned image at a desired resolution. In a preferred embodiment, the scanning means 34 comprises a plurality of individual photodetectors 38 linearly mounted adjacent one end of the housing 12. Such photodetectors 38 may comprise any conventional photosensor or photodetector. Preferably, such photodetectors 38 are charge-coupled devices which generate an analog electrical voltage signal representative of the intensity of light impinging thereon. The number of photodetectors 38 employed across the height of the housing 12 will depend on the desired resolution for the display 20 and may be coordinated with the resolution of the display 20. If the resolution of the photodetector 38 is greater than the resolution of the display 20, the output signals of the photodetectors 38 may be decimated by known techniques.

Although an internal light source, not shown, such as one or more lamps, may be mounted within the housing 12 to direct light onto the document or business card 11 as the card 11 is scanned by the photodetectors 38 in the housing 12, in one embodiment of the present invention a focusing lens 40 of glass or plastic is mounted at one end of the housing 12 adjacent to the detector surface of the photodetectors 38. The lens 40 focuses ambient light onto the document or business card 11 so as to reflect such light toward the photodetectors 38. This eliminates the need for an internal lamp in the housing 12 and resulting energy drain on the internal power source.

To coordinate the scanning of the business card 11 with movement of the housing 12, a pair of wheels 42, only one of which is shown in FIG. 2, are mounted at one end of the housing, preferably adjacent the lens 40 or photodetectors 38, so as to rotatably contact the document 11 as the housing 12 is slowly moved across the length of the document 11. The wheels 42 are connected by an axle 43 which extends across and is rotatably mounted in the side edges of the housing 12. One of the rotatable wheels 42 includes a signal generator, such as a reed switch or rheostat, which generates a pulse or changing voltage for each complete 360° rotation or any predetermined amount of partial rotation of the wheel 42. The pulse signals are input to a processor mounted within the housing 12 and provide a signal corresponding to the lines of resolution of the image scanned by the photodetectors 38.

The internal circuitry employed in the apparatus 10 of the present invention is depicted in block diagram form in FIG. 3. The apparatus 10 includes a processor means 48 which executes a stored control program to receive the electrical data signals from the scanning means 34 and to store the electrical data signals representative of the images on the document or business card 11, line-by-line, in a memory 50. The processing means 48 preferably includes a central processing unit 52 which may be any conventional processor or microcomputer. The central processing unit 52 executes a control program containing a set of instructions which is stored in a read-only memory 54. The central processing unit 52 communicates through input/output connections 56 which buffer or condition the signals transmitted between the central processing unit 52 and the various elements of the apparatus 10 as described hereafter.

The electrical signals generated by the photodetectors 38, which, in the case of a charge coupled device type photodetector, are in the form of an analog voltage varying in proportion to the intensity of light reflected off of the image to the photodetector 38, is converted to a digital signal by an analog/digital converter 58. The digital signals are input through the input/output connections 56 to the central processing unit 52 which then stores such data signals, representative of the image on the document or business card 11, line-by-line in the memory 50. At the same time, the central processing unit 52 displays the image received from the image scanning means 34 on the display 20 by providing suitable signals through the input/output connections 56 to a display controller 60 which controls the line-by-line and pixel display of such images on the display 20. Optionally, the central processing unit 52 communicates through the input/output connections 56 with an auxiliary connector port 62 and a remote, wireless communication means 67, both of which are described in greater detail hereafter.

The memory 50 may be in any size commensurate with the specific application and, further, may be volatile or non-volatile. Preferably, non-volatile memory, such as EPROM or subminiature rotating magnetic disc memory, may be employed in the apparatus 10.

The auxiliary connector port 62 is in the form of an electrical connector or jack mounted in the housing 12 and connected to the input/output connections 56. The auxiliary connector port 62 is adapted to receive a plug-in electrical connector 64 attached to an electrical conductor or cable 65 for connecting one apparatus 10 to another, identical apparatus 10 for the two-way, serial or parallel, communication of electrical data signals representing images on small documents or business cards 11 between the two apparatus 10. Alternately, the apparatus 10 may be connected by the cable 65 through the auxiliary port 62 to any external processor based device, such as a PC or other computer.

The apparatus 10 of the present invention is optionally provided with a remote wireless communication means 67. The remote communication means 67 includes a suitable controller 66 which provides for bi-directional transmission of data between the central processing unit 52 and a transmitter 68 and a receiver 70 mounted on one edge of the housing 12, as shown in FIGS. 1 and 5. The remote communication means 67 may utilize any suitable form of remote communication, such as radio frequency, infrared, etc.

Before describing the operation of the apparatus 10 in scanning, storing, displaying and retrieving images from small documents, such as business cards 11, it will be understood that the apparatus 10 may include a suitable on/off switch to operate the apparatus 10. Alternately, a software-controlled sleep timer may be employed to turn the apparatus 10 off if none of the input buttons 24, 26, 28 and 30 are depressed within a certain period of time. The depression of any of the input buttons 24, 26, 28 and 30 will reactivate the apparatus 10 for subsequent operation.

Figure 4A:
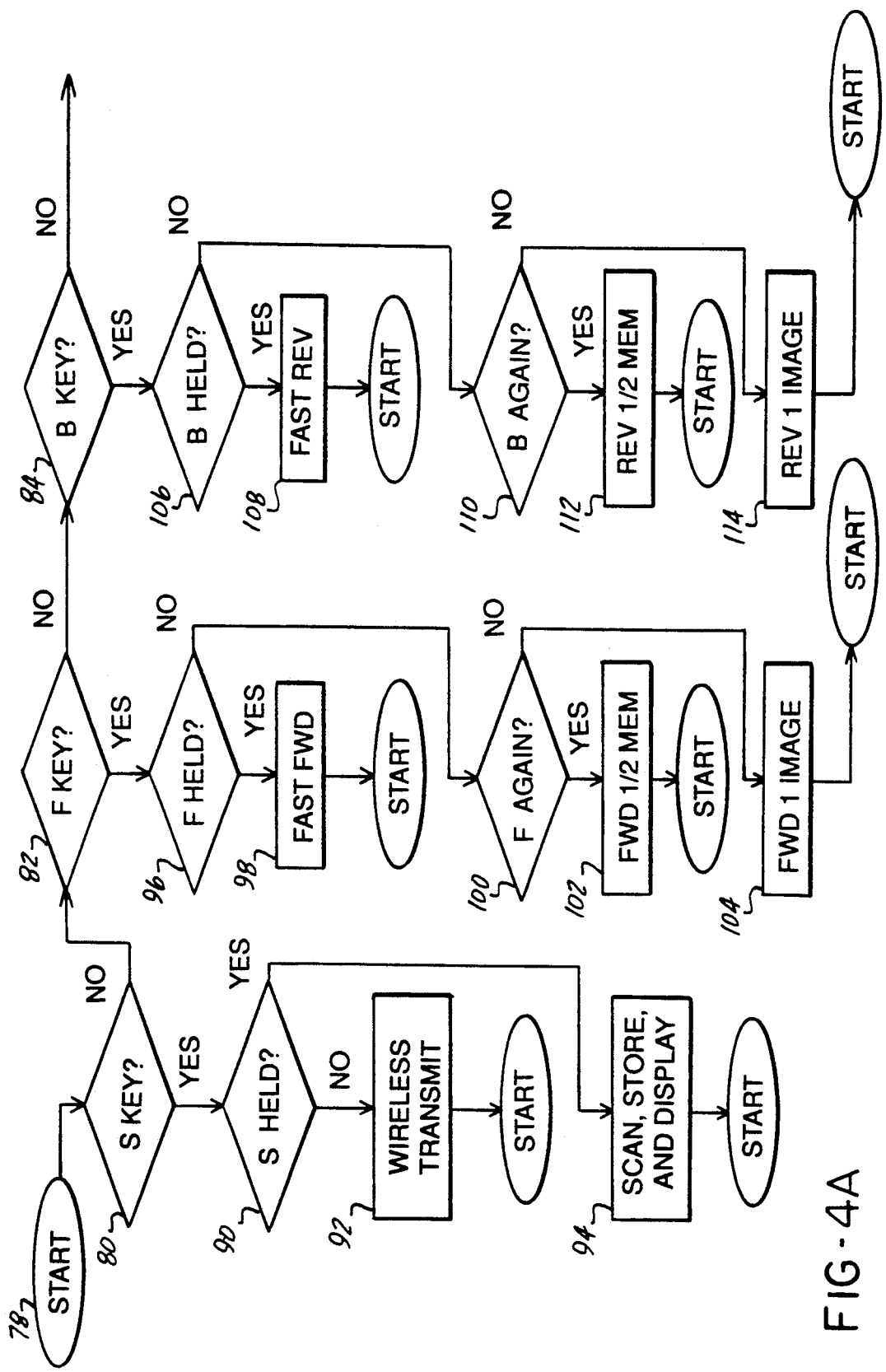
FIGS. 4A and 4B are flow diagrams depicting the operational sequence of the control program executed by the processor in the apparatus of the present invention.
Figure 4B:
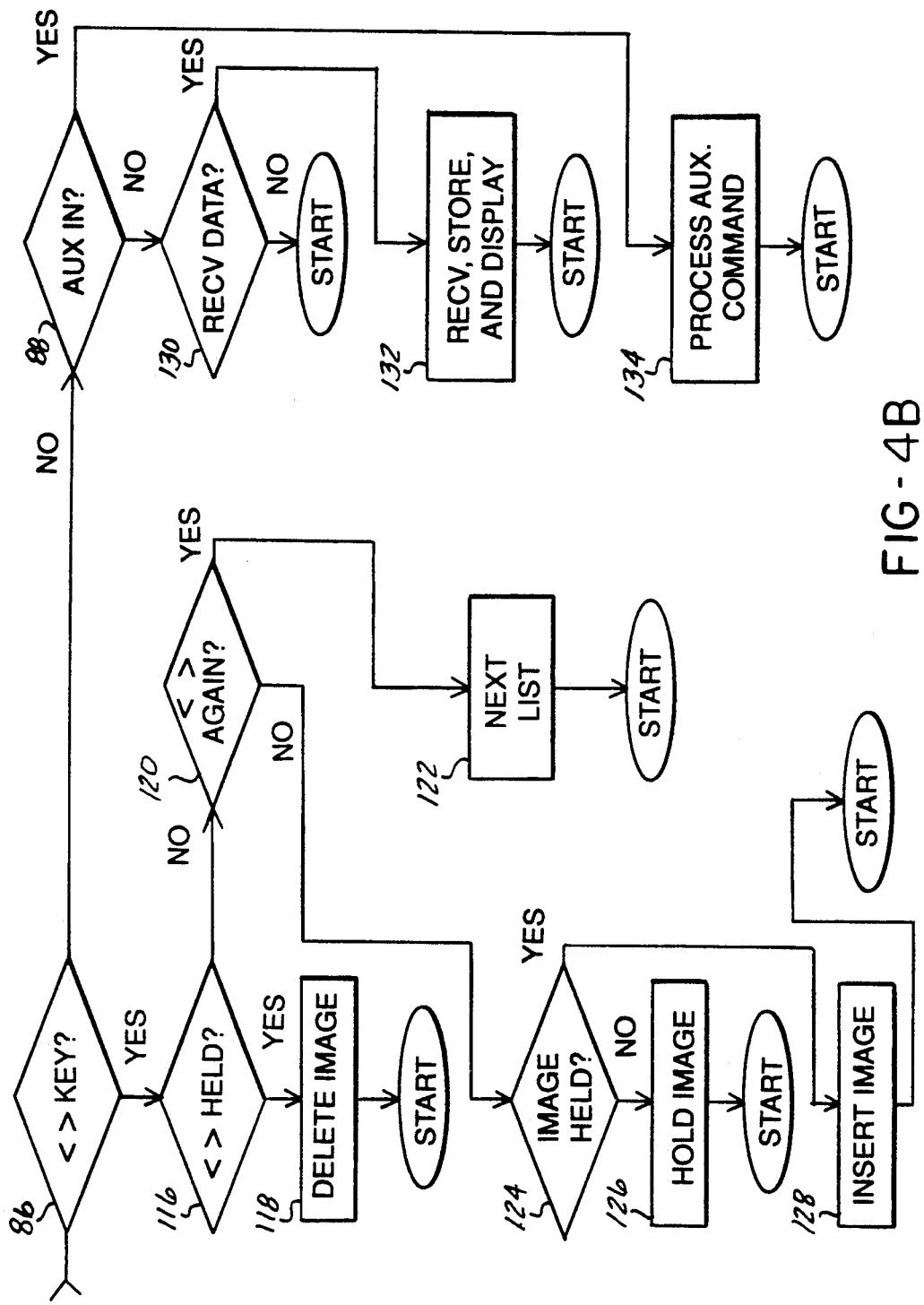

Referring now to FIGS. 4A and 4B, there is illustrated a flow chart depicting the operation of the central processing unit 52 in executing its control program stored in the memory 54 in various modes of operation. After the apparatus 10 is activated as described above, the control program polls the input buttons 24, 26, 28 and 30 as well as the auxiliary connector port 62 or the receiver 70 of the remote communication means 67 to detect any auxiliary input or button depression. Specifically, the central processing unit 52 polls the S-button 24, in decision branch 80 for any depression of the S-button. If the S-button 24 is depressed, the decision branch following such depression, as shown in FIG. 4A, will be executed. If the S-button 24 is not depressed, the control program polls for depression of the F-button 26 in decision branch 82. If the F-button 26 is depressed, the forward data retrieval branch will be executed. However, if the F-button 26 is not depressed, decision branch 84 is executed to detect any depression of the B-button 28. If the B-button 28 is present, the reverse data retrieval operation, as described hereafter, will be executed. If the B-button 28 has not been depressed, decision branch 86 will be executed to detect depression or actuation of the edit button 30. If the edit button 30 is not depressed, the control program polls for an auxiliary input in decision step 88.

If none of the input buttons or buttons 24, 26, 28 and 30 are pressed, and no external input is present, the control program returns to the initial Scan step 78 and repeats the top level polling sequence described above for any input. This creates an initial loop polling program which could also be obtained by using a hardware interrupt or an event driven programming method.

If the S-button 24 is depressed, the control program in decision branch 90 determines if the S-button 24 is held in a depressed state. If the S-button 24 is depressed, as detected in decision step 80 in FIG. 4A, and is not held down, as detected in decision step 90, the apparatus 10 executes a software routine in step 92 to transmit via the transmitter 68 the image currently displayed on the display 20 via the remote communication means 67 to an external processor device. After the remote transmission has been completed, the control program returns to the Scan step 78.

If decision step 90 determines that the S-button 24 is held down, this causes the control program to execute software code denoted generally by step 94 to scan the image on the document or business card 11, store the electrical data signals representative of the image thereon in the memory 50 and to concurrently display the image on the display 20. After the scan, store and display cycle, as denoted by step 94, the control program returns to the Scan step 78 to begin the top level polling for subsequent inputs.

In a preferred embodiment, the image is stored in the memory 50 in a linked list in front of the image that was displayed on the display 20 before the present scan. The linked list 140, shown in FIG. 6, allows rapid insertion, deletion, searching and the reordering of the stored images.

Figure 6:
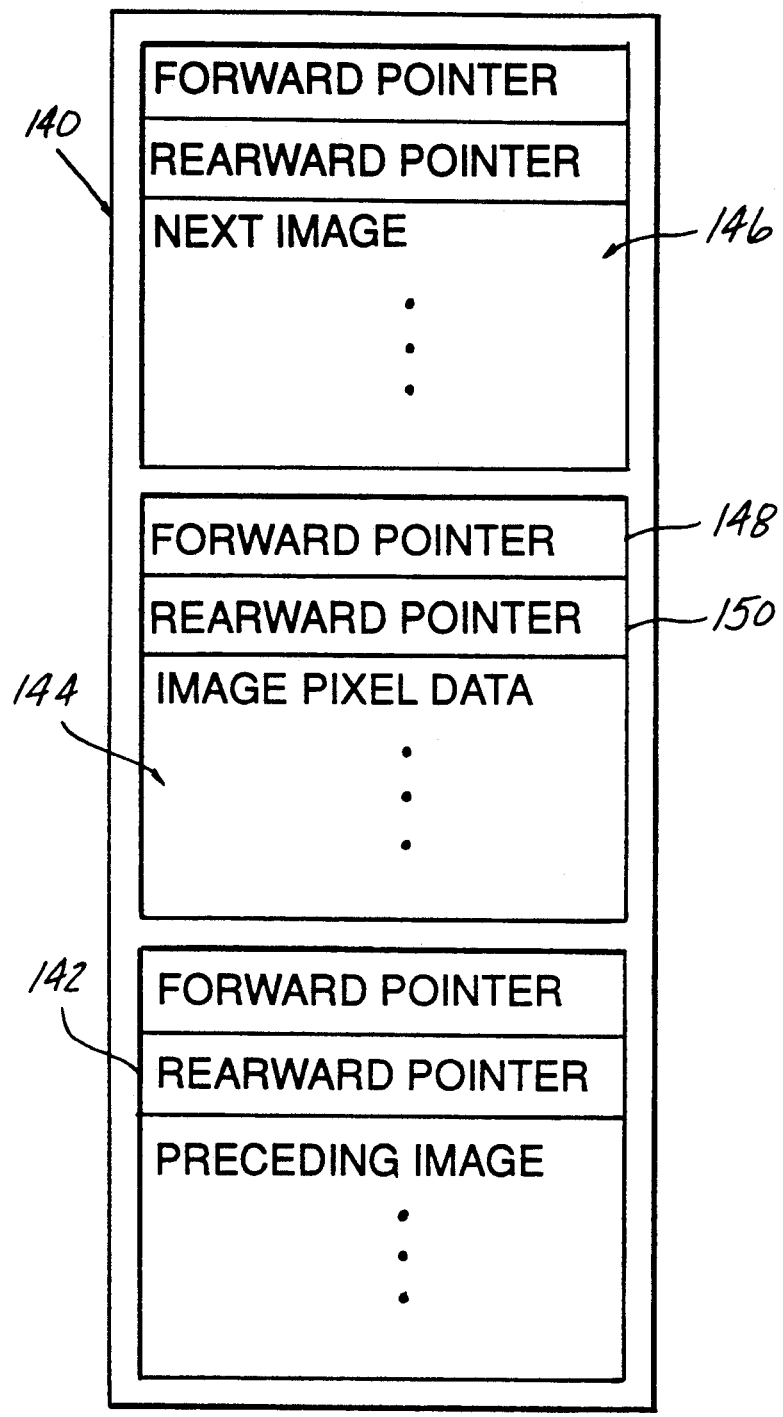
FIG. 6 is a pictorial representation of a portion of a linked list of a series of images stored in the memory of the apparatus of the present invention.

FIG. 6 depicts a succession of address locations in memory 50 in which a preceding image 142 in the form of pixel bit data is stored behind the pixel bit data 144 of the image currently being scanned. The central processing unit 52, via the control program, includes means for linking a succession of images 142, 144, 146, etc., in a list. This is achieved by providing a forward pointer or address 148 and a rearward pointer or address 150 with the data for each image 142, 144, 146, etc. The forward pointer 148 includes the address of the start location of the next image 146 data stored in the memory 50. The rearward pointer 150 stores the address of the start location of the preceding image 142 data. By merely changing the forward and/or rearward pointers or addresses 148 and 150 of any image, the images may be relinked in any order without moving the image data in memory 50.

If the F-button 28 has been depressed as detected in decision branch 82, the control program in decision branch 96 determines whether or not the F-button 26 is held in a depressed state. If the F-button 26 is held down as determined by decision step 96, the control program executes software in block 98 which rapidly advances to the next images in the linked list stored in the memory 50 and displays such images one after another until the F-button 28 is released or the end of the images in the particular linked list has been reached. To speed up this display process, several images may be skipped or not displayed at all. It may also be possible to increase the number of skipped images or to decrease the display time the longer the F-button 26 is depressed. When the F-button 26 is finally released the control program will return to the Scan step 78. If decision branch 96 determines that the F-button 26 has not been held in a depressed state, the control program then will check in decision step 100 to determine if the F-button 26 is depressed again within a predetermined time period. This double press of the F-button 26, as detected by decision branch 100, if present, causes the control program to execute software in block 102 which causes an image halfway between the current image and the end of the stored images in a linked list in the memory 50 to be displayed on the display 20. This halving of the remaining search of the images in the linked list is a conventional technique commonly referred to as a binary search. After the image has been displayed on the display 20, the control program returns to the Scan step 78. If a double press of the F-button 26 has not occurred as determined by decision branch 100, indicating that the F-button 26 was pressed only once, the central processing unit 52 causes the next image in the linked list stored in the memory 50 to be displayed on the display 20 before the control program returns to the Scan step 78.

The steps taken by the control program when the B-button 28 is depressed are similar to the actions described above for the F-button 26 except that the B-button 28 causes the control program to retrieve, search and display images on the display 20 in a reverse order through a particular linked list. Thus, as shown in FIG. 4A, decision branch 106 determines if the B-button 28 is held in a depressed state. If so, the control program causes a sequential fast display of images stored in a particular linked list in the memory 50 in a reverse order from the end to the beginning of the list. If the B-button 28 is not depressed, the control program checks for a second depression in decision step 110. If a second depression of the B-button 28 is detected in decision branch 110, the control program executes a binary search by retrieving an image from the memory 50 and displaying the image on the display 20 which is halfway between the current image and the beginning of the linked list. If decision step 110 determines that the B-button 28 has not been depressed a second time, the control program retrieves from the memory 50 and displays on the display 20 the image preceding the current image in the linked list.

As shown in FIG. 4B, if the edit button 30 has been depressed as detected by the top level polling decision branch 86, the control program determines in decision branch 116 determines if the edit button 30 has been held down for a predetermined time interval. If so, the control program executes software in step 118 which permanently removes the image currently displayed on the display 20 from the linked list in the memory 50 by, for example, nulling its forward or rearward pointers 148 and 150 and then displays the previous image in the linked list stored in the memory 50. After the delete operation has been completed, the control program returns to the Scan step 78. If the edit button 30 is depressed a second time, as detected in decision branch 120, the control program switches to the next sequential linked list stored in the memory 50. This process can be repeated any number of times to select between a number of different linked lists stored in the memory 50. This feature may be employed by a user of the apparatus 10 to organize images in several different categories, such as by company, product, service, profession, etc.

A separate table of start pointers or addresses may be stored in memory 50 which indicate the starting address of the first image in each linked list of images stored in memory 50.

If the edit button 30 is not held down or depressed a second time, and there is no image stored in a temporary storage area in the memory 50, as determined by decision branch 124, then the control program executes code in step 126 to move the displayed image to the temporary storage area in the memory 50. The links in the list stored in the memory 50 previously containing this selected image are broken and the list re-linked together into a complete sequential list. The control program then returns to the Scan step 78 and the F-button 26 and the B-button 28 can be used to move through the stored images in a linked list to a new location where the user wants to store the image that is currently held in the temporary storage area. If the edit button 30 is pressed, but not held down, and an image is stored in the temporary storage area, as determined by decision step 124 in FIG. 4B, the control program inserts the image stored in the temporary storage area in front of the image displayed on the display 20, re-links it to the list of images via appropriate forward and rearward pointers or addresses 148 and 150 and returns to the Scan 78.

If data is received by the auxiliary connector port 62, as detected by the high level polling decision branch 88 in FIG. 4B, the control program will execute software in step 130 to process the external data request by receiving such data from the auxiliary connector port 62 through the input/out connections 56 and storing such data in a linked list format in the memory 50.

If data is received from the remote wireless communication receiver 70, as detected by decision branch 130 in FIG. 4B, the control program executes software to receive, store and display the received data as it is received from the receiver 70. After the image transmission is complete, the control program returns to the Scan step 78.

Thus, through the input buttons 24, 26, 28 and 30, the user has the capability of scanning small documents 11, such a business cards, letterhead, return addresses on envelopes, as well as handwritten, typed or printed notes to input such information as a complete image which is stored in memory and displayed on the display 20 of the apparatus 10 The image is stored in the memory 50 in a linked list in succession with previously stored images and followed by succeeding scanning images. Through the use of the F-button 26, the B-button 28 and the edit button 30, the user has the capability of retrieving any image from the memory 50 for display as well as reordering the sequence of any image in the linked list format of images stored in the memory 50. Several different linked lists may be accessed thereby enabling the user to categorize the images in any particular order.

In another embodiment shown in FIG. 7, an apparatus 160 includes a housing 162 containing a display means 20, input means in the form of buttons 24, 26, 28 and 30, an auxiliary connector port 62, a remote wireless communication means 67 and a processor means 48 including a central processing unit 52 and a memory means including memories 50 and 54, as substantially described above. As the operation of these elements is identical to that described above and shown in FIGS. 1-6, such elements, for reasons of clarity, have not been depicted in FIG. 7.

The apparatus 160 shown in FIG. 7 lacks the scanning means 34 shown in FIGS. 1 and 2. Instead, the apparatus 160 includes an image sensor means 168 in the form of a plurality of photodiodes arranged in a grid arrangement of rows and columns. The number and size of the overall grid arrangement of photodetectors forming the image sensor means 168 is selected to provide a predetermined image resolution.

An optical lens means 170 is mounted in the housing 162 and faces outward from the back surface 163 thereof. The lens means 170 is preferably a fixed focal length lens for focusing images on a document 11 disposed below the back surface 163 of the housing 162 onto the image sensor means 168. At least one and preferably a pair of light means 172 are also mounted in the housing and face outward from the back surface 163 thereof for illuminating the document 11 and to provide adequate light for the focusing of the image on the document 11 through the lens 170 onto the image sensor means 168. The light means 172 may be light emitting diodes, small light bulbs or other suitable light sources.

The image sensor means which preferably comprise charge coupled devices generates electrical signals representative of the intensity of light impinging on each charge coupled device and thereby creates a pixel image via the row and column arrangement of photodiodes, i.e., charge coupled devices, forming the image sensor means 168 corresponding to the image on the document 11. These electrical signals are input to the central processing unit 52 and processed in the same manner as described above for storage in the memory 50, simultaneous or subsequent display on the display means 20 and reordering via the input buttons 24, 26, 28 and 30 as described above. In this embodiment, it will be noted that the S-button 24, instead of initiating a scan operation, initiates a start of image record function which activates the image sensor means 168 to record the light reflected from the image on the document 11 thereon for a predetermined time in accordance with light conditions, the focal length of the lens 180, etc., in a normal fashion.

It will also be noted that a plurality of legs 164 are pivotally mounted to the housing 162, preferably to the side edges thereof, and are movable from a storage position substantially in parallel with the side edges of the housing 162 to a deployed position substantially perpendicular to the back surface 163 of the housing 162. The legs 164 support the housing 162 above a small document 11 and place the lens 170 at a predetermined, fixed distance from the document 11.

In a third, more simplified embodiment of the apparatus of the present invention, the apparatus includes most of the features shown in FIGS. 1 and 7 and described above for the first two embodiments of the present invention. However, the simplified embodiment of the apparatus lacks any scanning means or image sensor means. In this simplified embodiment, electrical signals or data corresponding to images on small documents is received solely through the auxiliary connector means 62 or through the remote wireless communication means 67. The S-button 24 can be used to turn the apparatus on. The function of the other input buttons 26, 28 and 30 are the same as that described above in the first two embodiments of the present invention with regard to recalling, sequentially displaying an reordering images from small documents which have been stored in the memory 50.

In summary, there has been disclosed a unique apparatus for recording, storing and displaying information contained on small documents, such as conventional business cards. The apparatus is hand-held so as to be easily portable and has a small pocket size so as to be conveniently held and used to scan or record small documents or portions of large documents and easily stored. The apparatus is capable of storing a large number of different images and displaying such images upon sequential retrieval on a display. The images may be reordered at user preference into a different order as well as in various user-selected categories.

What is claimed is:

1. An apparatus for recording, storing and displaying images of small documents, the apparatus comprising:
    a hand-held housing;
    image sensor means, mounted in the housing, for sensing the image of a document, the image sensor means providing an electrical signal data stream representative of the images of a document;
    processor means, mounted in the housing and responsive to the electrical signal data stream from the image sensor means, for storing the electrical signal data stream representing the images of a single document in a memory;
    display means, mounted on the housing and responsive to the processor means, for displaying one of the images of the document being sensed by the image sensor means and the image of a document previously stored in the memory;
    input means, mounted on the housing and connected to the processor means, for providing input signals to the processor means to initiate the recording of images of a document and the retrieval of images from the memory for display on the display means;
    the processor means including means for linking a succession of images each representing the image of a discrete document input to the processor means into a sequential linked list of images in the memory; and
    the input means further including:
    bidirectional input means, mounted on the housing, for supplying forward and rearward recall signals, when actuated, to the processor means to initiate first and second opposed sequential displays, respectively, on the display means of the images of documents stored in the memory in the order of the linked list of the images.

2. The apparatus of claim 1 wherein:
    the memory is mounted in the housing and connected to the processor means, the memory storing a control program executed by the processor means and the electrical signal data stream representing images of recorded documents.

3. The apparatus of claim 2 wherein the image sensor means comprises:
    photodetector means, mounted in the housing, for detecting images of a document as the housing is moved over the document.

4. The apparatus of claim 3 wherein the image sensor means further comprises:
    lens means, mounted in the housing adjacent to the photodetector means, for focusing ambient light onto the document being scanned to reflect the images of the document to the photodetector means.

5. The apparatus of claim 3 wherein the photodetector means are arranged in a row in the housing.

6. The apparatus of claim 5 further comprising:
    rotary signal generating means, mounted in the housing and rotatable as the housing is moved over a document, for generating an electrical signal for every predetermined number of degrees of rotation thereof.

7. The apparatus of claim 1 further including:
    a power supply mounted in the housing and connected to the image sensor means, the processor means, the display means and the input means.

8. The apparatus of claim 1 further including:
    auxiliary connector means, mounted in the housing and connected to the processor means, for communicating electrical signals via a plug-in electrical conductor selectively attachable to the auxiliary connector means, between the processor means in the housing and an external device.

9. The apparatus of claim 1 further including:
    remote wireless communication means, mounted in the housing and connected to the processor means, for transmitting and receiving electrical data signals between the processor means and an external device.

10. The apparatus of claim 1 wherein the input means comprises:
    a scan button mounted on the housing and supplying a signal, when actuated, to the processor means to initiate the start of recording and storing images on a document in the memory.

11. The apparatus of claim 10 wherein the bidirectional input means comprises:

a forward button mounted on the housing and supplying a forward recall signal, when actuated, to the processor means to initiate a first directional sequential display on the display means of the images of documents stored in the memory in the order of the linked list of the images.

12. The apparatus of claim 11 wherein the bidirectional input means comprises:
a back button mounted on the housing and supplying a reverse recall signal, when actuated, to the processor means to initiate a second directional sequence display, opposite from the first directional sequence, of images of documents stored in the memory in the order of the linked list of the images.

13. The apparatus of claim 1 wherein:
the input means further comprises edit means, mounted on the housing, for generating an edit signal, when activated, to the processor means to remove the image currently displayed on the display means from the linked list of images in the memory; and wherein
the processor means further includes means, responsive to the edit signal, for removing the image currently displayed on the display means from the linked list of stored images and temporarily storing the removed image in memory and for reinserting the temporary stored image in the linked list of images in a predetermined sequence with respect to a different image of the linked list of images subsequently displayed on the display means.

14. The apparatus of claim 1 wherein:
the image sensor means generates an analog output signal corresponding to the amount of light reflected off of the image on the document, and further including:
an analog to digital converter means, mounted in the housing, for converting the analog signals output from the image sensor means to digital electrical signals.

15. The apparatus of claim 1 wherein the image sensor means comprises:
a plurality of photodetectors mounted in rows and columns and facing outward from a surface of the housing; and
an optical lens of a predetermined focal length mounted in the housing adjacent the photodetectors for focusing reflected images from a document onto the photodetectors.

16. The apparatus of claim 15 further comprising:
illumination means, mounted in the housing, for illuminating a document disposed in proximity with the housing.

17. An apparatus for recording, storing and displaying images of small documents, the apparatus comprising:
a hand-held housing;
image sensor means, mounted in the housing, for sensing the image of a document, the image sensor means providing an electrical signal data stream representative of the images of a document, the image sensor means including:
photodetector means, mounted in the housing, for detecting images on a document disposed in proximity with the housing;
processor means, mounted in the housing and responsive to the electrical signal data stream from the image sensor means, for storing the electrical signal data stream representing the images of a single document in a memory;
the memory mounted in the housing and connected to the processor means, the memory storing a control program executed by the processor means and the electrical signal data stream representing images of a plurality of documents;
display means, mounted on the housing and responsive to the processor means, for displaying one of the images of the document sensed by the image sensor means and the image of a document previously stored in the memory;
input means, mounted on the housing and connected to the processor means, for providing input signals to the processor means to initiate the recording of the image of a document and the retrieval of images from the memory for display on the display means;
the processor means including means for linking a succession of images each representing the image of a discrete document input to the processor means into a sequential linked list of images in the memory.

18. The apparatus of claim 17 wherein:
the photodetector means generates an analog output signal corresponding to the amount of light reflected off of the image of the document, the image sensor means further including:
an analog to digital converter means, mounted in the housing, for converting the analog signals output from the photodetector means to digital electrical signals.

19. The apparatus of claim 17 wherein the input means comprises:
a scan button mounted on the housing and supplying a signal, when actuated, to the processor means to initiate the start of recording and storing images of a document in the memory.

20. The apparatus of claim 19 wherein the input means further comprises:
a forward button mounted on the housing and supplying a forward recall signal, when actuated, to the processor means to initiate a first directional sequential display on the display means of the images of documents stored in the memory in the order of the linked list of the images.

21. The apparatus of claim 20 wherein the input means further comprises:
a back button mounted on the housing and supplying a reverse recall signal, when actuated, to the processor means to initiate a second directional sequence display, opposite from the first directional sequence, of the images of documents stored in the memory in the order of the linked list of images.

22. The apparatus of claim 21 wherein:
the input means further comprises edit means, mounted on the housing, for generating an edit signal, when activated, to the processor means to remove the image currently displayed on the display means from the linked list of images in the memory; and wherein
the processor means further includes means, responsive to the edit signal, for removing the image currently displayed on the display means from the linked list of stored images and temporarily storing the removed image in memory and for reinserting the temporary stored image in the linked list of images in a predetermined sequence with respect to a different image of the linked list of images subsequently displayed on the display means.

23. The apparatus of claim 17 wherein the photodetector means are arranged in a row in the housing.

24. The apparatus of claim 23 further comprising:
rotary signal generating means, mounted in the housing and rotatable as the housing is moved over a document, for generating an electrical signal for every predetermined number of degrees of rotation thereof.

25. The apparatus of claim 17 wherein the image sensor means comprises:
a plurality of photodetectors mounted in rows and columns and facing outward from a surface of the housing; and
an optical lens of a predetermined focal length mounted in the housing adjacent the photodetectors for focusing reflected images from a document onto the photodetectors.

26. The apparatus of claim 17 further comprising:
illumination means, mounted in the housing, for illuminating a document disposed in proximity with the housing.

27. An apparatus for storing and displaying images of small documents, the apparatus comprising:
a hand-held housing;
data receiving means, mounted in the housing, for receiving electrical signal data representative of images of a document;
processor means, mounted in the housing and responsive to the electrical signal data stream from the data receiving means, for storing the electrical signal data representing the images of a single document in a memory;
display means, mounted on the housing and responsive to the processor means, for displaying one of the images of the document sensed by the data receiving means and the image of a document previously stored in the memory;
input means, mounted on the housing and connected to the processor means, for providing input signals to the processor means to initiate the storage of images of a document and the retrieval of images from the memory for display on the display means;
the processor means including means for linking a succession of images each representing the image of a discrete document input to the processor means into a sequential linked list of images in the memory; and
the input means further including:
bidirectional input means, mounted on the housing, for supplying forward and rearward recall signals, when actuated, to the processor means to initiate first and second opposed sequential displays, respectively, on the display means of the images of documents stored in the memory in the order of the linked list of the images.

28. The apparatus of claim 27 wherein:
the memory is mounted in the housing and connected to the processor means, the memory storing a control program executed by the processor means and the electrical signal data representing the images of documents.

29. The apparatus of claim 27 further including:
a power supply mounted in the housing and connected to the data receiving means, the processor means, the display means and the input means.

30. The apparatus of claim 27 further including:
auxiliary connector means, mounted in the housing and connected to the processor means, for communicating electrical signals via a plug-in electrical conductor selectively attachable to the auxiliary connector means, between the processor means in the housing and an external device.

31. The apparatus of claim 27 further including:
remote wireless communication means, mounted in the housing and connected to the processor means, for transmitting and receiving electrical data signals between the processor means and an external device.

32. The apparatus of claim 27 wherein the input means further comprises:
a button mounted on the housing and supplying a signal, when actuated, to the processor means to initiate the start of recording and storing images of a document in the memory.

33. The apparatus of claim 32 wherein the bidirectional input means comprises:
a forward button mounted on the housing and supplying a forward recall signal, when actuated, to the processor means to initiate a first directional sequential display on the display means of the images of documents stored in the memory in the order of the linked list of the images.

34. The apparatus of claim 33 wherein the bidirectional input means further comprises:
a back button mounted on the housing and supplying a reverse recall signal, when actuated, to the processor means to initiate a second directional sequence display, opposite from the first directional sequence, of images of documents stored in the memory in the order of the linked list of the images.

35. The apparatus of claim 27 wherein:
the input means further comprises an edit button, mounted on the housing and generating an edit signal, when activated, to the processor means to remove the image currently displayed on the display means from the linked list of images in the memory; and wherein
the processor means further includes means, responsive to the edit signal from the edit button, for removing the image currently displayed on the display means from the linked list of stored images and temporarily storing the removed image in memory and for reinserting the temporary stored image in the linked list of images in a predetermined sequence with respect to a different image of the linked list of images subsequently displayed on the display means.

* * * * *